Patented July 18, 1950

2,515,318

UNITED STATES PATENT OFFICE 2,515,318

POLYMERIZATION OF 2-SUBSTITUTED THIAZOLES

Dwight L. Schoene, Naugatuck, Conn., assignor to United States Rubber Company, New York, N. Y., a corporation of New Jersey No Drawing. Application June 5, 1945, Serial No. 597,716

13 Claims. (Cl. 260—79.7)

This invention relates to the polymerization of 2-substituted thiazoles, which subscribe to the general formula $$T-\underset{\alpha}{\overset{Z}{C}}=\underset{\beta}{CH_2}$$

where T represents a thiazole ring; Z is hydrogen or methyl.

The thiazole ring, as known, conforms to the structure

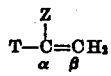

the 2 carbon atom being joined directly to the alpha carbon atom in the above formula. The 4 and 5 carbon atoms may each be attached to various radicals, for example, to hydrogen, alkyl, or aryl radicals, or may be part of an aryl or an alkylene ring.

The compounds as new chemicals are the subject of copending application Serial No. 597,715, filed June 5, 1945.

The following examples are given to illustrate preparation of the chemicals, the parts being by weight:

Procedure 1

The 2-alkyl thiazole is condensed with formaldehyde yielding the 2-(betahydroxy ethyl)-thiazole which is dehydrated to the desired 2-substituted thiazole as shown in Equations I and II.

I.

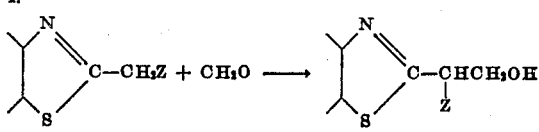

II.

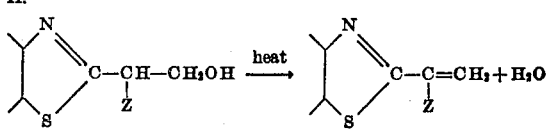

Dependent upon whether Z is hydrogen or methyl, an unsubstituted or an alpha-methyl-substituted 2-vinyl-thiazole will be formed.

Procedure 2

Alpha - benzoxythiopropionamide or alpha-benzoxy - alpha - methylthiopropionamide, prepared according to the procedure of Olin and Johnson (Rec. trav. chim. 50, 72–6 (1931)), is condensed with an alpha-halogenated aldehyde or ketone and the resultant thiazole derivative is pyrolyzed to form benzoic acid and the 2-substituted thiazole, as shown in Equations III and IV.

III.

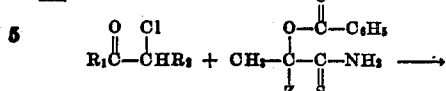

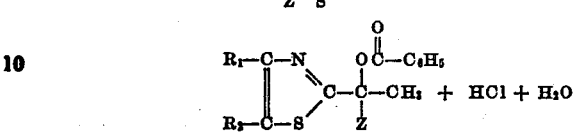

IV.

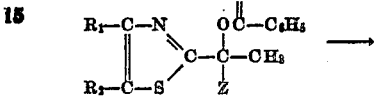

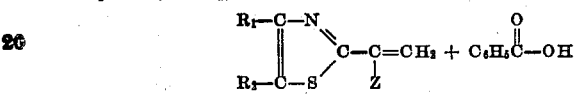

If Z is hydrogen, an unsubstituted vinyl group is formed; if Z is methyl, an alpha-methyl vinyl group is formed. If $R_1$ and $R_2$ are hydrogen, a thiazole free of substituents at carbon atoms 4 and 5 is formed. $R_1$ and $R_2$ may be varied at will to give the various substituted thiazoles. When Z is ethyl or higher homolog, the reaction IV is complicated by the formation of other thiazole chemicals having entirely different properties from the particular formulated thiazoles of this invention; this complication does not arise where Z is hydrogen or methyl.

The pyrolysis of the 2-(benzoxyethyl)-thiazoles can conveniently be carried out in a tube filled with activated alumina and maintained at temperatures of 300 to 600° C. The alumina undoubtedly exerts some catalytic effect, but pyrolysis can also be effected by bringing the esters in contact with other heated surfaces, e. g., the sides of the pyrolysis tube. If desired, the esters may be hydrolyzed with alkali to the corresponding carbinols which can then be dehydrated to the 2-substituted thiazoles using activated alumina at 300–600° C., or potassium acid sulfate at 200–300° C. Fused potassium acid sulfate is likewise suitable for the pyrolysis of the esters.

In the variations of procedure 2, benzoic acid may be isolated from the reaction product of crystallization or extraction with alkali. The 2-substituted thiazole formed may be separated from unreacted ester or carbinol by distillation, preferably under reduced pressure, since the vinyl derivatives are appreciably lower boiling than their parent compounds.

Procedure 1 is applicable whether or not carbon atoms 4 and 5 are part of an aryl ring. Procedure 2 is limited to the preparation of 2-substituted thiazoles wherein carbon atoms 4 and 5 are not part of an aryl ring.

The present 2-substituted thiazoles are colorless liquids with an odor similar to but less offensive than pyridine. They are soluble in a number of organic solvents, e. g., benzene, chloroform, acetone, and ethanol, and in aqueous acids, e. g., hydrochloric, sulfuric, formic, and phosphoric, but are only slightly soluble in water. Extended storage is possible in the presence of small amounts of polymerization inhibitors such as phenyl-beta-naphthylamine, hydroquinone, p-tert.-butyl-catechol, etc. They discolor rapidly when exposed to light.

I have found that the present 2-substituted thiazoles will polymerize with themselves (homopolymerization) or with other polymerizable substances such as the polymerizable 1,3-dienes, and other vinyl compounds (co- or heteropolymerization). Such polymerizations can be conveniently carried out in aqueous emulsions in the presence of suitable peroxide catalysts, many of which are known to the art. When polymerization is complete, the emulsified polymers may be used directly or the emulsions coagulated to yield solid polymers.

The present poly-2-substituted thiazoles may be obtained as solid thermoplastic resins which may be rolled into sheets or molded and shaped to give a variety of useful products. They may be dissolved in a number of organic solvents, e. g., benzene, acetone, ethyl acetate, chloroform, solvent naphtha, etc., and the solvent evaporated leaving flexible films of the present poly-2-substituted thiazoles. They may also be dissolved in aqueous solutions of acids, e. g., hydrochloric, and sulfuric acid, and precipitated by alkalis, e. g., ammonia, and sodium hydroxide. This provides a means of coating or impregnating materials with aqueous solutions of the polymers and this avoids the toxicity and explosive hazards of organic solvents.

The present 2-substituted thiazoles will copolymerize with polymerizable substances such as the polymerizable 1,3-dienes, or with mixtures of the 1,3-dienes and other vinyl compounds, as aforesaid, to yield rubber-like polymers of considerable utility. These copolymers and terpolymers may be compounded with sulfur and other vulcanizing agents, softeners, accelerators, antioxidants, fillers and dyes, and cured to give products suitable for use in tires, inner tubes, boots, hose, hard rubber goods, and the like.

The addition of the 2-substituted thiazole to the said dienes or to the mixtures of the dienes with other vinyl compounds, often increases the rate of polymerization and improves the tensile strength and rate of cure of the final polymers. This permits vulcanization at lower temperatures, or with reduced amounts of accelerators and vulcanizing agents.

The 2-substituted thiazoles and the dienes or mixtures of dienes with other vinyl compounds may be mixed in any proportion. The products containing less than about 5 parts of the 2-substituted thiazole will, naturally, show few of the advantages of the 2-substituted thiazole while products containing upwards of 50 per cent of the 2-substituted thiazole will be more plastic and less rubber-like than those containing about 5 to 50 parts of the 2-substituted thiazole.

Exemplary of 2-substituted thiazoles within the present invention are:

2-vinylthiazole
4-methyl-2-vinylthiazole
4-ethyl-2-vinylthiazole
4-propyl-2-vinylthiazole
4-isopropyl-2-vinylthiazole
4-butyl-2-vinylthiazole
4-phenyl-2-vinylthiazole
4-(p-chorophenyl)-2-vinylthiazole
4-beta-naphthyl-2-vinylthiazole
5-methyl-2-vinylthiazole
5-ethyl-2-vinylthiazole
5-amyl-2-vinylthiazole
5-phenyl-2-vinylthiazole
4,5-dimethyl-2-vinylthiazole
4-ethyl-5-methyl-2-vinylthiazole
4,5-tetramethylene-2-vinylthiazole (2-vinyltetrahydrobenzothiazole)
2-(alpha-methylvinyl)-thiazole
4-methyl-2-(alpha-methylvinyl)-thiazole
4,5-dimethyl-2-(alpha-methylvinyl)-thiazole
5-methyl-2-(alpha-methylvinyl)-thiazole
4-phenyl-2-(alpha-methylvinyl)-thiazole
2-vinyl benzothiazole
2-(alpha-ethylvinyl)-thiazole
2-(alpha-propylvinyl)-thiazole
2-(apha-butylvinyl)-thiazole
2-(alpha-amylvinyl)-thiazole
4-methyl-2-vinyl benzothiazole
6-ethoxy-2-vinyl benzothiazole
5-chloro-2-vinyl benzothiazole Exemplary of usable 1,3-dienes, amongst others, are the polymerizable 1,3-conjugated dienes such as:

Butadiene-1,3; isoprene; piperylene, 2,3-dimethyl-butadiene-1,3; 1,3-dimethyl-butadiene-1,3; and 1,2-dimethyl-butadiene-1,3.

Exemplary of vinyl compounds or derivatives, amongst others, which may be mixed, prior to polymerizing, with any of the mentioned 1,3-dienes are the compounds containing the

group which are copolymerizable with said dienes, and which includes the synthetic elastomer-forming monomers selected from the ring-substituted vinyl compounds and their alpha-substituted vinyl derivatives, the acrylonitriles, and the esters of acrylic acids, e. g., styrene, alpha-methylstyrene; the o,m- and p-chlorostyrenes, 2,5-dichlorostyrene; 2-vinylpyridine, 2-methyl-5-vinylpyridine, 5-ethyl-2-vinylpyridine, acrylonitrile, methacrylonitrile, methyl acrylate, butyl acrylate, methyl methacrylate, and 2-vinylfuran.

The 2-substituted thiazoles may also be mixed in the polymerized form with the diene-vinyl copolymer rubbers, on the mill.

The 2-substituted thiazoles may also be mixed in monomeric liquid form, prior to cure, with any of a number of other heat-reactive (heat-hardenable) resins, e. g., from vinyl chloride, vinyl acetate, urea-aldehydes, melamine-aldehydes, vinylidene chloride, and alkyds of unsaturated acids such as produced from poly condensation of glycols with maleic acid or maleic anhydride, e. g., the polyester known as polyethylene maleate. Also, the 2-substituted thiazoles in their polymeric thermoplastic form, may be mixed on the mill with the uncured or cured polymerized forms of such resins as are known under the various names of vinylites (vinyl chloride-vinyl acetate copolymers), Geon (polyvinyl chlorides), Saran (polyvinylidene chloride), as well as the vinyl chloride-vinylidene chloride copolymers, etc.

For purposes of illustration, the general polymerization formula used is as follows, the parts being by weight:

| | Parts |
|---|---|
| Total monomers | 100 |
| Sodium stearate | 5.0 |
| Potassium persulfate | 0.3 |
| Lauryl mercaptan | 0.4–0.7 |
| Water | 200 |

The ingredients are charged into crown capped bottles and agitated on a revolving wheel in a thermostat. At the end of the polymerization, the latices are treated with 0.1–0.3 parts hydroquinone and 2.0 parts BLE (a commercial ketone-diarylamine antioxidant). They are then steam-distilled to remove unreacted monomers, coagulated with salt and dilute sulfuric acid and dried at 55° C.

Specific examples are given as follows; the parts are by weight:

(a) 75 parts of butadiene-1,3 and 25 parts of 2-vinyl thiazole in the above formula, gives a 73 per cent conversion to a rubber-like polymer in 17 hours at 45° C. The polymer is soluble in benzene and has a solution viscosity of 1.85, where solution viscosity is defined as $$\frac{Ln\frac{ti}{to}}{C}$$

where $ti$ and $to$ are the times required for the solution and the solvent, respectively, to run through a capillary, and $C$ is the concentration in grams of polymer per 100 ml. of solution. Ln represents the Naperian or natural logarithm. By sulfur analysis, the copolymer contains 20 parts combined 2-vinylthiazole.

(b) 75 parts butadiene-1,3 and 25 parts 4-methyl-2-vinylthiazole in the above formula gives an 86 per cent conversion to a tacky rubber-like copolymer in 15 hours at 45° C. The polymer contains 62 per cent benzene insoluble gel. By sulfur analysis the polymer contains 21 parts combined 4-methyl-2-vinylthiazole.

This example illustrates the acceleration in polymerization rate caused by the 4-methyl-2-vinylthiazole. Butadiene in the same formula customarily requires 25 hours or more to reach the same conversion.

(c) 75 parts butadiene-1,3, 20 parts styrene, and 5 parts 4-methyl-2-vinylthiazole in the above polymerization formula gives an 87 per cent conversion in 15 hours at 45° C. The terpolymer is tough, rubber-like and contains 5 per cent of benzene insoluble gel. Its solution viscosity is 1.85. By sulfur analysis the polymer contains 4.2 parts combined 4-methyl-2-vinylthiazole.

This example illustrates how 4-methyl-2-vinylthiazole accelerates the polymerization of butadiene with another vinyl compound. A 75/25 weight ratio of butadiene/styrene in this formula would require about 20 hours to reach this same conversion.

(d) 10 grams of 4-methyl-2-vinylthiazole are polymerized in the above formula for 15 hours at 45° C. Before polymerization, the air in the bottle is displaced by a stream of nitrogen. The final latex is coagulated by pouring it into 20 per cent ethanol containing just enough sulfuric acid to liberate fatty acid from the soap. After drying, the poly-2-vinyl-4-methyl thiazole recovered weighs over 9 g. The polymer is a flexible resin with a solution viscosity in benzene of 0.62. It is soluble in a number of organic solvents and in aqueous acids but is insoluble in water and alkalis.

(e) 75 parts butadiene-1,3 and 25 parts of 4,5-dimethyl-2-vinylthiazole (90 per cent pure) are copolymerized in emulsion using the above formula. The conversion is 49 per cent after 39 hours at 45° C. The rubber-like copolymer, by sulfur analysis, contains 14 parts combined 4,5-dimethyl-2-vinylthiazole.

(f) 75 parts butadiene-1,3 and 25 parts 4-phenyl-2-vinylthiazole (67% pure) are copolymerized in the above formula giving a 70 per cent conversion after 4 days at 45° C. The copolymer is a rubber-like material containing 12 parts combined 4-phenyl-2-vinylthiazole.

(g) 75 parts of butadiene-1,3 and 25 parts 4-methyl-2-(alpha-methylvinyl)-thiazole are copolymerized in the above formula. The conversion is 40 per cent after 40 hours at 45° C. The soft, rubber-like copolymer contains 31 parts combined 4-methyl-2-(alpha-methylvinyl)-thiazole by sulfur analysis and is completely soluble in benzene.

(h) 75 parts butadiene-1,3 and 25 parts 2-vinyl benzothiazole are copolymerized in the above formula. The conversion is 55 per cent after 87 hours at 45° C. The soft, rubber-like copolymer is soluble in benzene with a solution viscosity of 2.72. By sulfur analysis it contains 7 parts combined 2-vinyl benzothiazole.

To illustrate the properties of vulcanized vinylthiazole copolymers and terpolymers, representative samples are compounded in the following recipe:

| | Parts by weight |
|---|---|
| Polymer | 100 |
| Channel black | 50 |
| Zinc oxide | 5 |
| Coal tar softener | 5 |
| Mercaptobenzothiazole | Variable |
| Sulfur | Variable |

The compounded polymers are cured at 145° C. and their properties are determined as shown in the following table: (B represents butadiene-1,3; MVT represents 4-methyl-2-vinylthiazole; alpha-methyl-MVT represents 4-methyl-2-(alpha-methylvinyl)-thiazole; and S represents styrene.)

| | Time of cure Minutes | (1) | (2) | (3) | (4) | (5) |
|---|---|---|---|---|---|---|
| Polymer Composition in parts by weight (charging ratio of monomers) | | B-75 MVT 25 | B-75 MVT 5 S 20 | B-75 αMethyl-MVT 25 | Commercial GR-S (B-72/S-28) | B-100 |
| Parts sulfur | | 1.5 | 2.0 | 1.5 | 2.0 | 2.0 |
| Parts mercaptobenzothiazole | | 0.75 | 1.0 | 1.0 | 1.5 | 1.5 |
| 300% Modulus in lbs./sq. inch (p. s. i.) | 30 | 1015 | 900 | 890 | 300 | 570 |
| | 60 | 1335 | 1140 | 1100 | 820 | 940 |
| | 90 | 1475 | 1275 | 1210 | 1080 | 1050 |
| Tensile at Break, p. s. i | 30 | 2190 | 2735 | 1940 | 1660 | 1460 |
| | 60 | 2300 | 2920 | 1940 | 2775 | 1900 |
| | 90 | 2120 | 2850 | 2060 | 2675 | 1980 |
| Percent Elongation at break | 30 | 523 | 663 | 583 | 833 | 510 |
| | 60 | 465 | 575 | 505 | 660 | 465 |
| | 90 | 420 | 530 | 505 | 543 | 445 |

These examples show clearly that the 2-substituted thiazoles improve polymer properties. The butadiene/4-methyl-2-vinylthiazole copolymer not only has greater tensile strength than polybutadiene but also cures much faster, as judged by modulus, even though it is compounded with reduced sulfur and accelerator. The butadiene/4-methyl-2-(alpha-methylvinyl)-thiazole copolymer gives similar results.

The butadiene/4-methyl-2-vinylthiazole/styrene terpolymer is also superior to commercial GR-S in tensile strength and curing rate.

The polymerization and compounding recipes used for the above examples are only illustrative and not intended to limit the invention to the specific conditions used since it is well known to those skilled in the art that many variations are possible in both compounding and polymerization techniques, without departing from the spirit of the invention.

Having thus described my invention, what I claim and desire to protect by Letters Patent is:

1. A method of forming polymeric compounds which comprises heating in the presence of a peroxide catalyst a compound of the formula

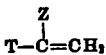

where T is a thiazole ring, and Z is a radical selected from the group consisting of hydrogen and methyl, in which the ethylenically unsaturated group shown is linked to carbon in the 2-position in the thiazole nucleus and constitutes the only unsaturated open-chain group attached to the thiazole nucleus.

2. A method of forming polymeric compounds which comprises heating in the presence of a peroxide catalyst an appreciable amount of a compound as set forth in claim 1 with a 1,3-butadiene compound from the group consisting of butadiene-1,3, isoprene, piperylene, 2,3-dimethyl butadiene-1,3; 1,3-dimethyl butadiene-1,3; 1,2-dimethyl butadiene-1,3 and another unsaturated compound which contains a $CH_2=C<$ group and is copolymerizable with said diene, the proportion by weight of the said thiazole monomer in the mixture of monomers ranging from 5 to 50 percent.

3. A polymer of 2-vinylthiazole.

4. An interpolymer of an appreciable amount of a compound as set forth in claim 1 with a polymerizable 1,3-diene from the group consisting of butadiene-1,3, isoprene, piperylene, 2,3-dimethyl butadiene-1,3; 1,3-dimethyl butadiene-1,3; 1,2-dimethyl butadiene-1,3 and styrene, in the proportion by weight of the said thiazole monomer in the mixture of monomers ranging from 5 to 50 percent.

5. An interpolymer of butadiene-1,3, styrene, and 4-methyl-2-vinylthiazole the proportion by weight of the said thiazole monomer in the mixture of monomers ranging from 5 to 50 percent.

6. An interpolymer of butadiene-1,3, styrene, and 2-vinylthiazole, the proportion by weight of the said thiazole monomer in the mixture of monomers ranging from 5 to 50 percent.

7. A method of forming polymeric compounds which comprises heating in the presence of a peroxide catalyst a mixture of monomers composed of a 2-substituted thiazole as set forth in claim 1, and a different polymerizable material selected from the class consisting of a monomeric 1,3-butadiene from the group consisting of butadiene-1,3, isoprene, piperylene, 2,3-dimethyl butadiene-1,3; 1,3-dimethyl butadiene-1,3; 1,2-dimethyl butadiene-1,3 and a monomeric compound containing a single $CH_2=C<$ group, the proportion of the 2-substituted thiazole constituting at least 5% of the mixture of monomers.

8. A method of forming polymeric compounds which comprises heating in the presence of a peroxide catalyst a mixture of monomers composed of a 2-substituted thiazole as set forth in claim 1, and a different polymerizable material selected from the class consisting of a monomeric 1,3-butadiene from the group consisting of butadiene-1,3, isoprene, piperylene, 2,3-dimethyl butadiene-1,3; 1,3-dimethyl butadiene-1,3; 1,2-dimethyl butadiene-1,3 and a monomeric compound containing a single $CH_2=C<$ group, the proportion of the 2-substituted thiazole constituting from about 5 to about 50% of the mixture of monomers.

9. A polymerizable mixture of monomers composed of a 2-substituted thiazole as set forth in claim 1, and a different polymerizable material selected from the class consisting of a monomeric 1,3-butadiene from the group consisting of butadiene-1,3, isoprene, piperylene, 2,3-dimethyl butadiene-1,3; 1,3-dimethyl butadiene-1,3; 1,2-dimethyl butadiene-1,3 and a monomeric compound containing a single $CH_2=C<$ group, the proportion of the 2-substituted thiazole constituting from about 5 to about 50% of the mixture of monomers.

10. A method of producing polymeric compounds which comprises preparing an aqueous emulsion containing a polymerizable 1,3-butadiene from the group consisting of butadiene-1,3, isoprene, piperylene, 2,3-dimethyl butadiene-1,3; 1,3-dimethyl butadiene-1,3; 1,2-dimethyl butadiene-1,3 and styrene in proportions sufficient to produce a rubber-like copolymer if polymerized together alone, and in addition from 5 to 50 percent by weight based on the mixture of monomers of a 2-substituted thiazole as set forth in claim 1 and a peroxide catalyst, and heating the emulsion.

11. Polymerized 2-vinyl-4 methylthiazole.

12. A copolymer of butadiene-1,3/2 vinyl-4-methylthiazole containing from 5% to 50% of 2-vinyl-4-methylthiazole.

13. A copolymer of 2-vinyl thiazole and butadiene containing from about 5% to about 50% of 2-vinyl thiazole.

DWIGHT L. SCHOENE.

REFERENCES CITED

The following references are of record in the file of this patent:

UNITED STATES PATENTS

| Number | Name | Date |
|---|---|---|
| 2,125,649 | Reppe | Aug. 2, 1938 |
| 2,393,132 | Wagner | Jan. 15, 1946 |

OTHER REFERENCES

Kuhn Justus Liebig's Annalen der Chemie Band 547 Heft, 3 page 295, June 18, 1941.

Kuhn (2) Justus Liebig's Annelen der Chemie Vol. 547, No. 3, page 294, June 18, 1941.